(12) United States Patent
Hara

(10) Patent No.: US 7,843,960 B2
(45) Date of Patent: Nov. 30, 2010

(54) MULTI-CARRIER RADIO TRANSMISSION SYSTEM, TRANSMISSION DEVICE, AND RECEPTION DEVICE

(75) Inventor: Shinsuke Hara, Suita (JP)

(73) Assignee: Fujitsu Limited, Kawasaki (JP)

( * ) Notice: Subject to any disclaimer, the term of this patent is extended or adjusted under 35 U.S.C. 154(b) by 800 days.

(21) Appl. No.: 11/188,074

(22) Filed: Jul. 22, 2005

(65) Prior Publication Data

US 2005/0254415 A1 Nov. 17, 2005

Related U.S. Application Data

(63) Continuation of application No. PCT/JP03/08277, filed on Jun. 30, 2003.

(51) Int. Cl.
*H04J 3/16* (2006.01)
*H04W 4/00* (2009.01)

(52) U.S. Cl. .................... 370/465; 370/341

(58) Field of Classification Search ......... 370/203–206, 370/208, 210, 334, 337, 465, 310, 464; 375/260
See application file for complete search history.

(56) References Cited

U.S. PATENT DOCUMENTS

| | | | | |
|---|---|---|---|---|
| 5,956,642 | A * | 9/1999 | Larsson et al. | 455/449 |
| 6,870,826 | B1 * | 3/2005 | Ishizu | 370/343 |
| 6,934,340 | B1 * | 8/2005 | Dollard | 375/260 |
| 6,975,583 | B2 * | 12/2005 | Jacobsen | 370/206 |
| 7,085,223 | B2 * | 8/2006 | Izumi | 370/204 |
| 7,486,735 | B2 * | 2/2009 | Dubuc et al. | 375/260 |
| 7,684,756 | B2 * | 3/2010 | Bohnke et al. | 455/45 |
| 2002/0105947 | A1 | 8/2002 | Kitagawa et al. | |
| 2002/0122499 | A1 * | 9/2002 | Kannan et al. | 375/260 |
| 2002/0167894 | A1 | 11/2002 | Jacobsen | |
| 2003/0043927 | A1 * | 3/2003 | Suzuki | 375/260 |

(Continued)

FOREIGN PATENT DOCUMENTS

EP 1204233 5/2002

(Continued)

OTHER PUBLICATIONS

ARIB STD-B24, Data Coding and Transmission Specification for Digital Broadcasting. ARIB, Jun. 2000.

(Continued)

*Primary Examiner*—Warner Wong
(74) *Attorney, Agent, or Firm*—Fujitsu Patent Center

(57) ABSTRACT

A multi-carrier radio transmission system able to improve frequency utilization efficiency, and a transmission device and a reception device used in the multi-carrier radio transmission system are disclosed. In the transmission device, at least one sub-carrier set to be the virtual sub-carrier is dynamically designated according to sub-carrier arrangement information. The reception device used in the above system includes an adaptive array antenna unit that is adaptively controlled so that signal components associated with the virtual sub-carriers in the received signals are reduced, and a determination unit that determines a pattern to be used in communications among plural sub-carrier arrangement patterns in which at least some of virtual sub-carrier arrangements are different. Because the virtual sub-carrier arrangement patterns can be used as identification information of radio signals, it is possible to improve utilization of frequency resources compared to the related art.

15 Claims, 9 Drawing Sheets

U.S. PATENT DOCUMENTS

| | | | |
|---|---|---|---|
| 2003/0048856 A1* | 3/2003 | Ketchum et al. | 375/260 |
| 2003/0112880 A1* | 6/2003 | Walton et al. | 375/260 |
| 2004/0062193 A1* | 4/2004 | Ma et al. | 370/208 |
| 2004/0139897 A1* | 7/2004 | Nakaya et al. | 114/1 |
| 2004/0233836 A1* | 11/2004 | Sumasu et al. | 370/206 |

FOREIGN PATENT DOCUMENTS

| | | |
|---|---|---|
| JP | 2001-148678 | 5/2001 |
| JP | 2001-339361 | 12/2001 |
| JP | 2002-271240 | 9/2002 |
| WO | WO-97/01256 | 1/1997 |
| WO | WO-02/31991 | 4/2002 |

OTHER PUBLICATIONS

ARIB STD-T70, Lower Power Data Communication Systems Broadband Mobile Access Communication System (CSMA), ARIB, Dec. 2000.

International Search Report dated Oct. 7, 2003 for International Application PCT/JP03/08277.

Shuichi Hane, et al. "OFDM Null-Steering Array Antenna". The Institute of Electronics, Information and Communication Engineers, vol. 102, No. 206, Jul. 12, 2002, pp. 31 to 36.

IEEE Std 802.11a-1999 (Supplement to IEEE Std 802.11-1999), Part 11: Wireless LAN Medium Access Control (MAC) and Physical Layer (PHY) specifications, High-Speed Physical Layer in the 5 GHz Band, pp. 1-83.

Notification of Filing Argument mailed Jul. 29, 2006.

Shinsuke Hara, et al. "A Novel OFDM Adaptive Antenna Array for Delayed Signal and Doppler-Shifted Signal Suppression" IEEE 2001, pp. 2302-2306.

"EPO Search Report", Dated Jul. 23, 2008.

Kapoor, Samir et al., "Adaptive Interference Suppression in Multiuser Wireless OFDM Systems Using Antenna Arrays", *IEEE Transactions on Signal Processing, IEEE Service Center*, New York, NY, US, vol. 47, No. 12 XP011058788 Dec. 1, 1999.

"Chinese Office Action", Complete English-language translation, mailed Jul. 3, 2009 from CN Patent Office for corresponding CN App. No. 03825923.0.

* cited by examiner

FIG.8
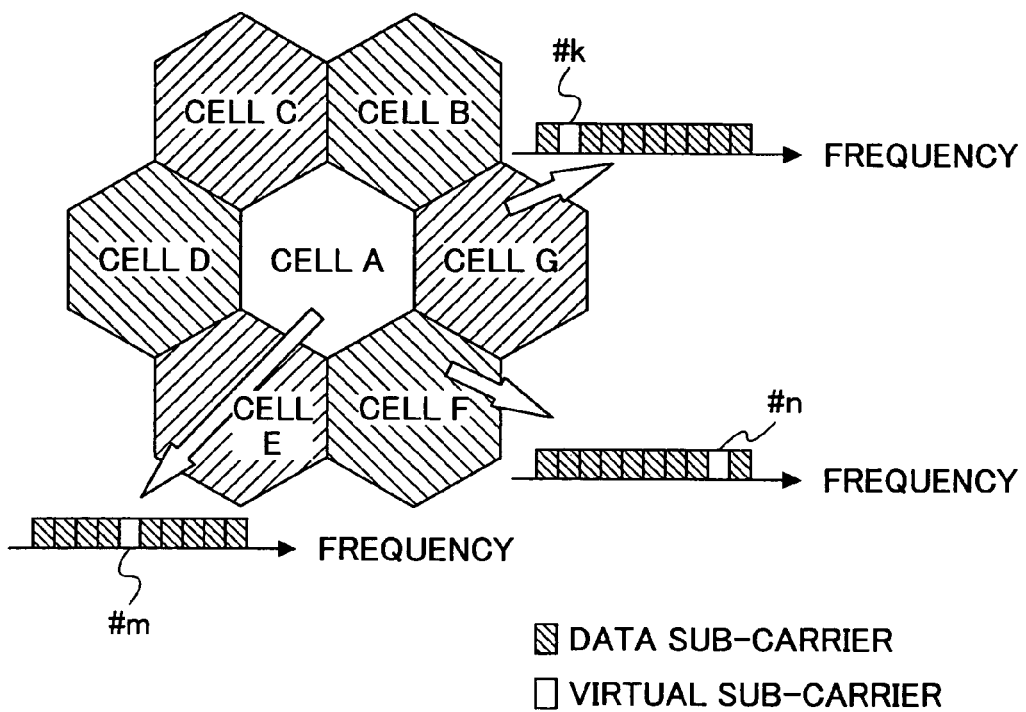
☒ DATA SUB-CARRIER
☐ VIRTUAL SUB-CARRIER
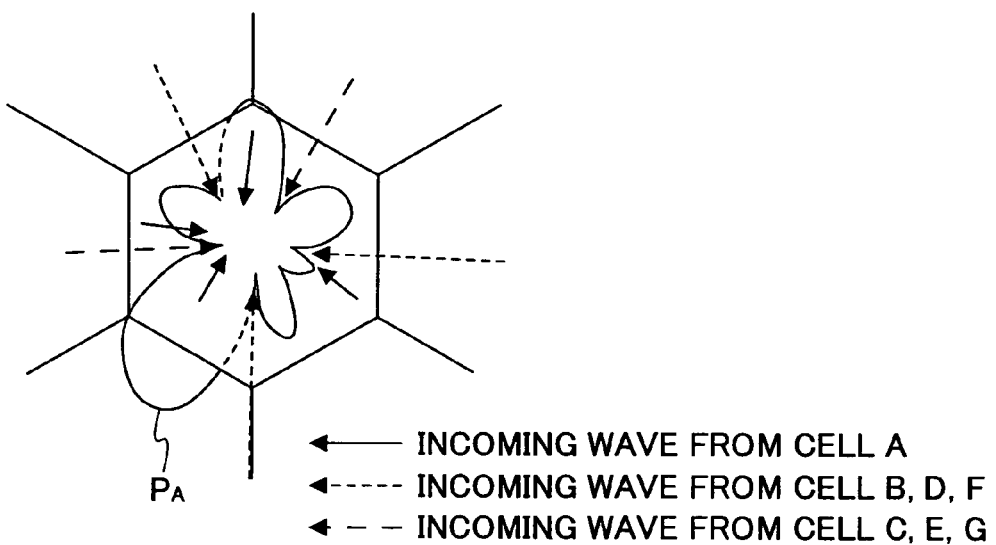
← INCOMING WAVE FROM CELL A
←----- INCOMING WAVE FROM CELL B, D, F
← − − INCOMING WAVE FROM CELL C, E, G

MULTI-CARRIER RADIO TRANSMISSION SYSTEM, TRANSMISSION DEVICE, AND RECEPTION DEVICE

CROSS-REFERENCE TO RELATED APPLICATION

This application is a U.S. continuation application filed under 35 USC 111(a) claiming benefit under 35 USC 120 and 365(c) of PCT application JP2003/008277, filed Jun. 30, 2003. The application is hereby incorporated herein by reference.

TECHNICAL FIELD

The present invention relates to the technical field of mobile communications, particularly, to a multi-carrier radio transmission system, and a transmission device and a reception device used in such a system.

BACKGROUND OF THE INVENTION

In the present technical field, in addition to requirements of high speed and high quality communications, it is also necessary to meet the needs of increasing the number of users accommodated in the system, and it is important to efficiently utilize communication resources such as frequencies.

A multi-carrier transmission method, which has attracted attention in recent years, uses plural sub-carriers to transmit data, thereby, for example, resulting in high transmission speed, and improving resistance to frequency selective fading. However, since the multi-carrier transmission method uses plural sub-carriers having various frequencies from low to high, depending on the communication environment, the signal quality may be degraded because of frequency offsets such as Doppler shifts.

On the other hand, in the multi-carrier transmission method, it is attempted to improve signal quality by using an adaptive array antenna (AAA). Specifically, weighting factors in the array are adaptively adjusted so that the magnitude of a signal component associated with a virtual sub-carrier in the received signals becomes zero, thereby reducing waves influenced by the Doppler shift and improving quality of communication signals. (For this technique, for example, reference can be made to H. Hanegi et al., "OFDM Null Steering Array Antenna", Transactions of the Institute of Electronics, Information and Communication Engineers, 2002-124, 2002, July). Generally, methods of the adaptive control include beam forming and null steering, wherein the former controls the main lobe to point to the desired wave, and the latter controls so as to suppress the undesired wave to null. Here, the latter one is used.

The virtual sub-carriers are sub-carriers not used for transmitting data, among the sub-carriers included in the frequency band assigned to the system, while the sub-carriers used for transmitting data are referred to as "data sub-carriers". It is fixed by the system which sub-carriers among many sub-carriers are the virtual sub-carriers. For example, as illustrated in the upper portion of FIG. 1, in order to reduce out-of-band emission power in non-linear amplification, some sub-carriers at the ends of the frequency band assigned to the system are set to be the virtual sub-carriers. (For this technique, for example, reference can be made to ARIB STD-B24, "Data Coding and Transmission Specification For Digital Broadcasting", ARIB, June, 2000). In addition, as illustrated in the lower portion of FIG. 1, in order to reduce direct current drift during base band processing of the received signal, some sub-carriers near the center of the frequency band are set to be the virtual sub-carriers. (For this technique, for example, reference can be made to ARIB STD-T70, "Lower Power Data Communication Systems Broadband Mobile Access Communication System (CSMA)", ARIB, December, 2000).

Specifically, among 64 sub-carriers, 52 sub-carriers are set to be data sub-carriers, and 12 sub-carriers are set to be virtual sub-carriers. Because the virtual sub-carriers fixed in this way are not used for data transmission, in modulation during signal transmission, the signal components associated with the virtual sub-carriers are set to be zero.

FIG. 2 is a diagram schematically illustrating a modulator in OFDM (Orthogonal Frequency Division Multiplexing). In OFDM, signal modulation is performed by the Inverse Fast Fourier Transformation (IFFT). For this reason, the time-series transmission data shown on the left side in FIG. 2 are converted into parallel signals by a series-parallel converter (S/P), and are input to an IFFT unit. All contents included in the parallel signals are in correspondence to the data sub-carriers. Contents of signals associated with the virtual sub-carriers are permanently fixed to be zero. Based on signals input and designated in such a way, the Inverse Fast Fourier Transformation is performed, modulated parallel signals are output, and afterward, through processing necessary for radio transmission, radio transmission is executed.

However, because the above techniques in the related art are not intended for distinguishing radio signals, it is difficult to use frequency resources simultaneously even with the above techniques. For example, when a user A is performing radio communications, another user B cannot perform radio communications. Even when the user A and user B are at geometrically different locations, one of them has to wait until communication (time slot) of the other one is finished.

DISCLOSURE OF THE INVENTION

The present invention is devised to solve the above problems.

An object of the present invention is to provide a multi-carrier radio transmission system able to improve frequency utilization efficiency, and a transmission device and a reception device used in the multi-carrier radio transmission system.

Another object of the present invention is to provide a multi-carrier radio transmission system able to improve frequency utilization efficiency by performing adaptive array antenna control while distinguishing radio signals, and a transmission device and a reception device used in the multi-carrier radio transmission system.

These objects are attained by the methods described below. According to the present invention, a multi-carrier radio transmission system is provided that performs radio transmission based on plural data sub-carriers and plural virtual sub-carriers, the data sub-carriers being sub-carriers used for data transmission, the virtual sub-carriers being sub-carriers not used for data transmission. In a transmission device used in the above system, at least one sub-carrier set to be the virtual sub-carrier is dynamically designated according to sub-carrier arrangement information. A reception device used in the above system includes an adaptive array antenna unit that is adaptively controlled so that signal components associated with the virtual sub-carriers in the received signals are reduced, and a determination unit that determines a pattern to be used in communication among plural sub-carrier arrangement patterns in which at least some of virtual sub-carrier arrangements are different.

According to the present invention, the position of a virtual sub-carrier in a sub-carrier arrangement pattern can be dynamically modified between the transmission device and the reception device, which performs communications. In response to arrangement information indicating arrangement patterns of the virtual sub-carriers, the transmission device and the reception device set one sub-carrier, which is originally set to be the data sub-carrier, in the virtual sub-carriers. A reception device, which receives radio signals transmitted by using a certain arrangement pattern S1, adaptively controls a directional pattern of an antenna so that signal components associated with the virtual sub-carriers are reduced. Radio signals based on another arrangement pattern S2 are directed to null, because non-zero signal components are included in the suppressed virtual sub-carriers. Therefore, the reception device has good reception of signals using the same arrangement pattern S1, but suppresses signals using the other arrangement pattern S2. Namely, according to the present invention, it is possible to use the position of the virtual sub-carrier (or arrangement pattern) as identification information of radio signals. Because the radio signals can be distinguished, it is possible to improve utilization of frequency resources compared to the related art.

BRIEF DESCRIPTION OF THE DRAWINGS

These and other objects, features, and advantages of the present invention will become more apparent with reference to the following drawings accompanying the detailed description of the present invention, in which:

FIG. 8 is a diagram illustrating the status of a cellular communication system to which the present invention is applied;

PREFERRED EMBODIMENTS FOR CARRYING OUT THE INVENTION

Below, embodiments of the present invention are explained with reference to the accompanying drawings.

Figure 1:
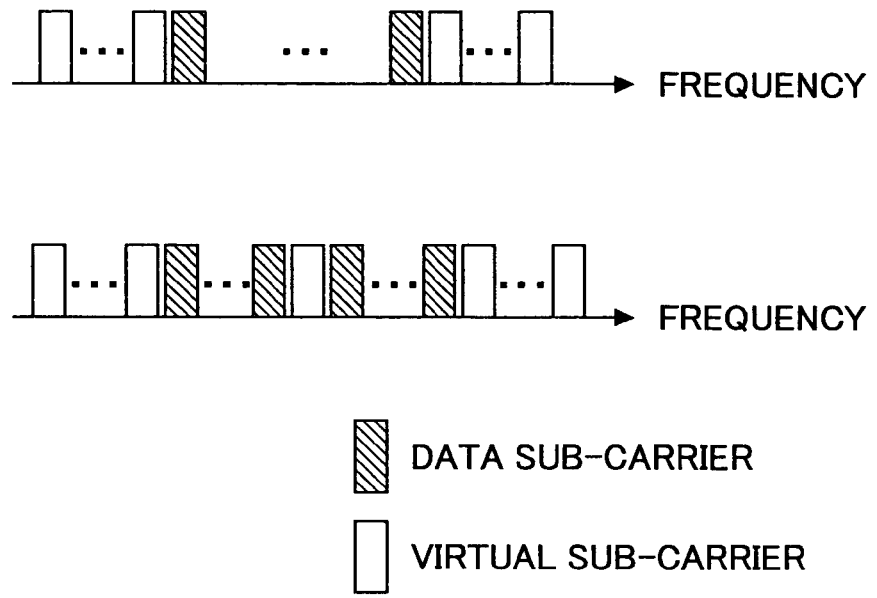
FIG. 1 is a diagram illustrating arrangement patterns of sub-carriers.
Figure 2:
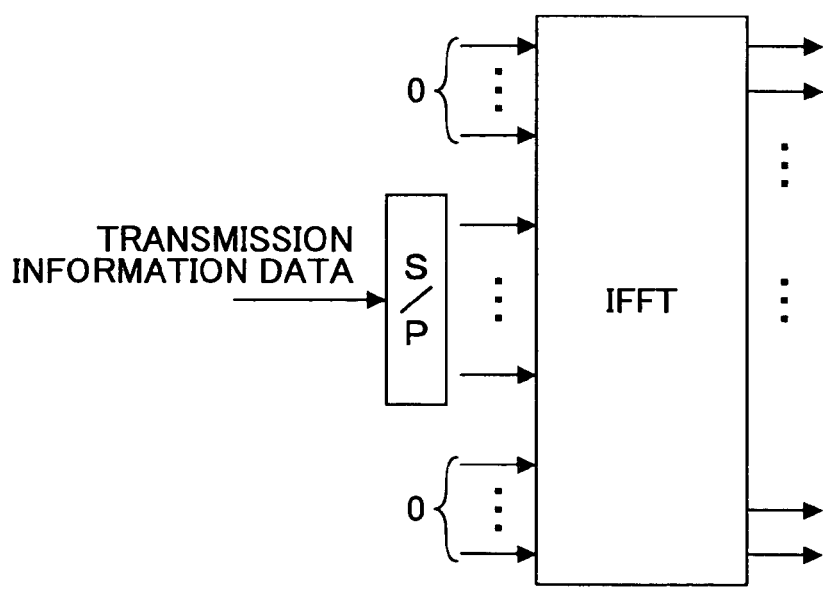
FIG. 2 is a diagram schematically illustrating a modulator in OFDM.

A communication system according to embodiments of the present invention may be implemented with the sub-carrier arrangements shown in FIG. 1, alternatively, implemented independently from these arrangements. At least some of the elements shown in the functional block diagrams presented below can be implemented, depending on specific applications, by software, by hardware, or by a combination of them.

Figure 3:
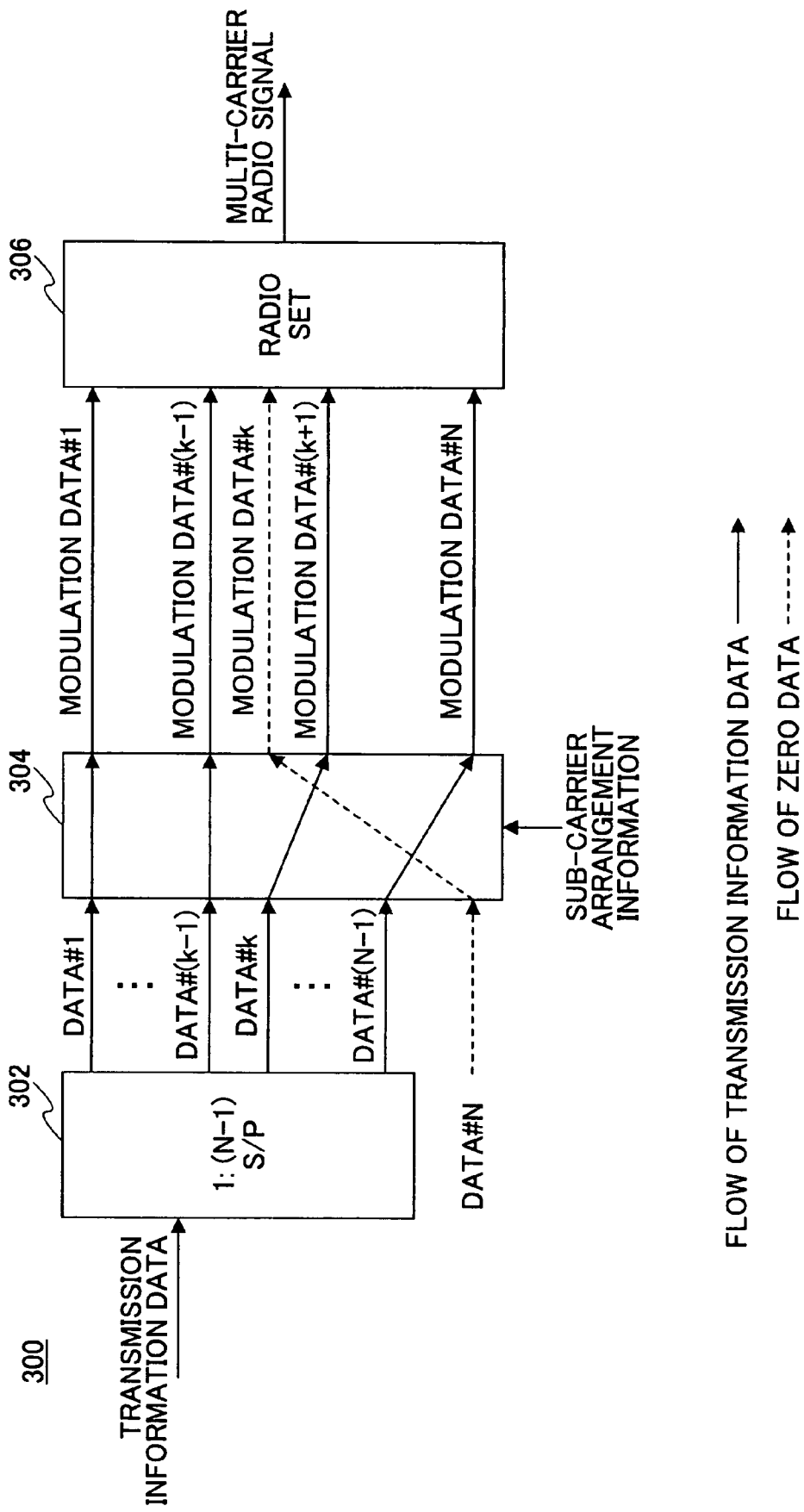
FIG. 3 is a block diagram illustrating principal functions of a transmission device according to an embodiment of the present invention.

FIG. 3 is a block diagram illustrating principal functions of a transmission device according to an embodiment of the present invention.

A transmission device 300 has a series-parallel converter (S/P) 302, which sequentially extracts N−1 data points from a series signal including a series of transmission data, associates them with N−1 signal sequences, and outputs parallel signals. Here, N is an integer greater than or equal to 2. The series of transmission data are coded by a not-illustrated encoder. Various methods can be used to perform the coding, for example, folding coding, or block coding.

The transmission device 300 has an assignment unit 304, which receives the parallel signals including N signal sequences and re-arranges the order of them based on sub-carrier arrangement information. Among the N signal sequences input to the assignment unit 304, N−1 signal sequences are the parallel signals from the series-parallel converter 302, and are set to be associated with data sub-carriers later. One more signal sequence input to the assignment unit 304 is set to be associated with virtual sub-carriers. This signal sequence, for example, always indicates zero (zero data).

The transmission device 300 has a radio set 306, which receives the parallel signals including the N signal sequences and modulates the received signal sequences in correspondence with their respective sub-carriers, outputs a series signal, performs waveform shaping and frequency transformation and so on, and outputs multi-carrier radio signals. The multi-carrier radio signals are emitted from a not-illustrated antenna. Here, for simplicity of description, when a "transmission device" is spoken of, the device has both a signal transmission function and a signal reception function. Similarly, in descriptions below, when a "reception device" is spoken of, the device has both a signal reception function and a signal transmission function.

Next, operations of the transmission device are described. First, when communication is started, for example, the transmission device 300 makes a request to a radio base state in its own system to establish a communication link. For example, this request may be made following a RTS (Request to Send) procedure. In response to this request signal, an appropriate radio channel is allocated, and the communication link is established. In the present embodiment, when this routine is executed, it is determined which sub-carrier is set to be a virtual sub-carrier among the N sub-carriers (or, which sub-carrier is set to be a data sub-carrier). For example, when an affirmative reply is made to the request to establish a communication link, the radio base station (or a radio base station under control of a higher-ranking control station) reports that the k-th sub-carrier is set to be a virtual sub-carrier. Here, k is an integer greater than or equal to 1 and less than or equal to N. The affirmative reply may be made following a CTS (Clear to Send) procedure. Alternatively, the transmission device 300 may request or direct that the k-th sub-carrier be set to be a virtual sub-carrier. In either case, it is sufficient to determine which sub-carrier is set to be a virtual sub-carrier at nodes at the two ends of the radio link, that is, which sub-carrier arrangement pattern is to be used. In this way, in the present embodiment, the position of at least one virtual sub-carrier in a sub-carrier arrangement pattern can be specified dynamically. This point is very different from the related art, in which the position of the virtual sub-carrier is fixed.

Once the communication link is established, processing is performed to convert the transmission information (non-zero) data into multi-carrier radio signals, and transmit multi-carrier radio signals from an antenna. Generally, in FIG. 3, solid line arrows indicate flows of the transmission information data being transmitted to the receiver side, and dashed line arrows indicate flows of zero data.

First, the series-parallel converter 302 converts the series signal into parallel signals at a ratio of 1:(N−1). N signal sequences, including the N−1 signal sequences and the signal sequence having the zero data are input to the assignment unit 304. The assignment unit 304 re-arranges the order of the N input signal sequences based on the sub-carrier arrangement information, and supplies the resulting signal sequences to the radio set 306. The radio set 306 modulates the N signal sequences including N−1 signal sequences having non-zero data (all modulation data except for the k-th signal sequence) and one signal sequence (the k-th signal sequence having the zero data). If OFDM is used, in the modulation, the Inverse Fast Fourier Transformation is performed, but the present invention is not limited to OFDM; for example, an oscillator can be provided, and other mapping can be performed. No matter which method is used, it is sufficient as long as data to be input with each of the sub-carriers can be carried by each of the sub-carriers.

Afterward, with well known methods, such as waveform shaping, or frequency transformation, multi-carrier radio signals are generated.

Figure 4:
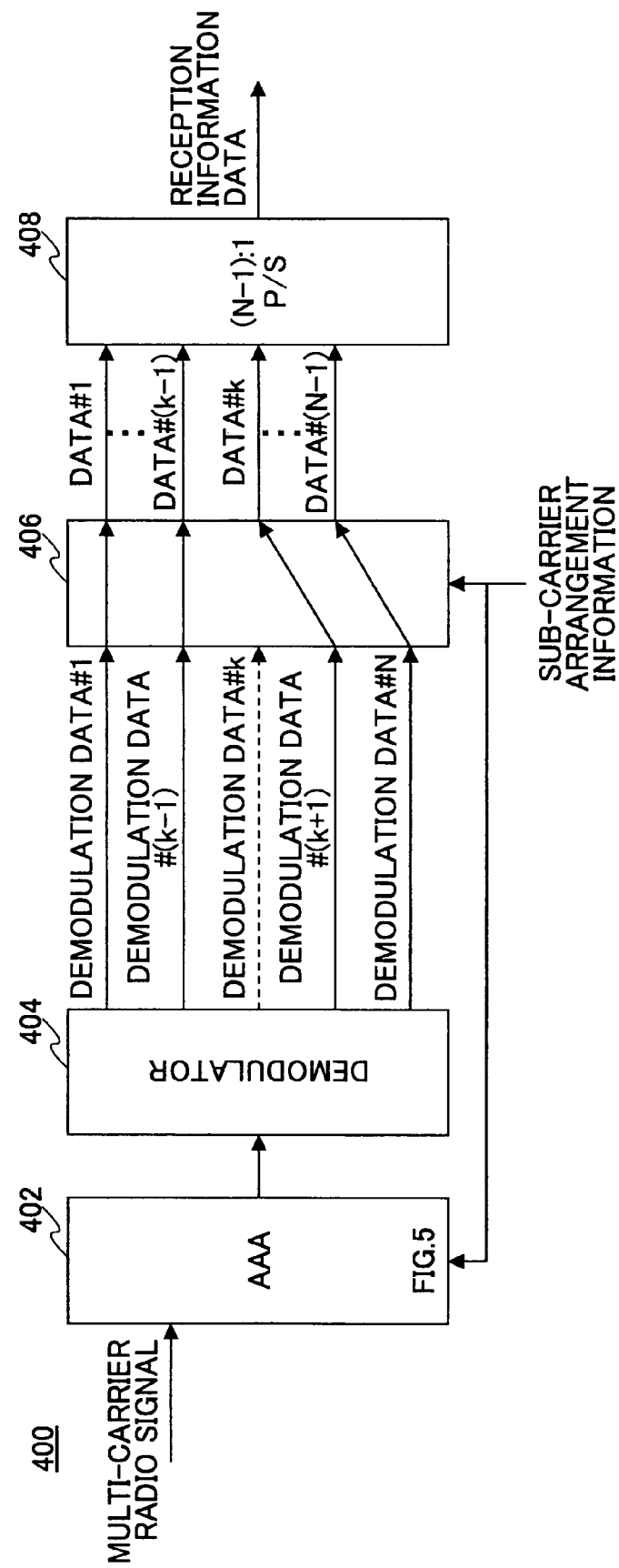
FIG. 4 is a block diagram illustrating principal functions of a reception device according to an embodiment of the present invention.

FIG. 4 is a block diagram illustrating principal functions of a reception device according to an embodiment of the present invention.

The reception device 400 includes an adaptive array antenna 402. The adaptive array antenna 402 receives the multi-carrier radio signals while suppressing unnecessary signal components in the multi-carrier radio signals, and outputs the signals to a subsequent demodulator 404. The demodulator 404 receives the multi-carrier radio signals and derives parallel signals (demodulation data 1 to data N) including N signal sequences. By demodulating the parallel signals, N signal sequences carried by respective sub-carriers are obtained. If the OFDM method is used, this demodulation is performed by the Fast Fourier Transformation.

The reception device 400 has an assignment unit 406, which receives the parallel signals including the N signal sequences, and re-arranges the order of the N signal sequences based on the sub-carrier arrangement information. More accurately, the signal sequence associated with the virtual sub-carrier (the k-th signal sequence) is excluded from the N signal sequences (demodulation data sequence), and parallel signals including N−1 signal sequences are output. The sub-carrier arrangement information, for example, is determined when the communication link is established between the transmission device 300 and the reception device 400.

The reception device 400 has a parallel series conversion unit (P/S) 408, which sequentially converts the data obtained from the N−1 signal sequences received in parallel into one series signal, and produces a signal sequence representing reception information data.

Figure 5:
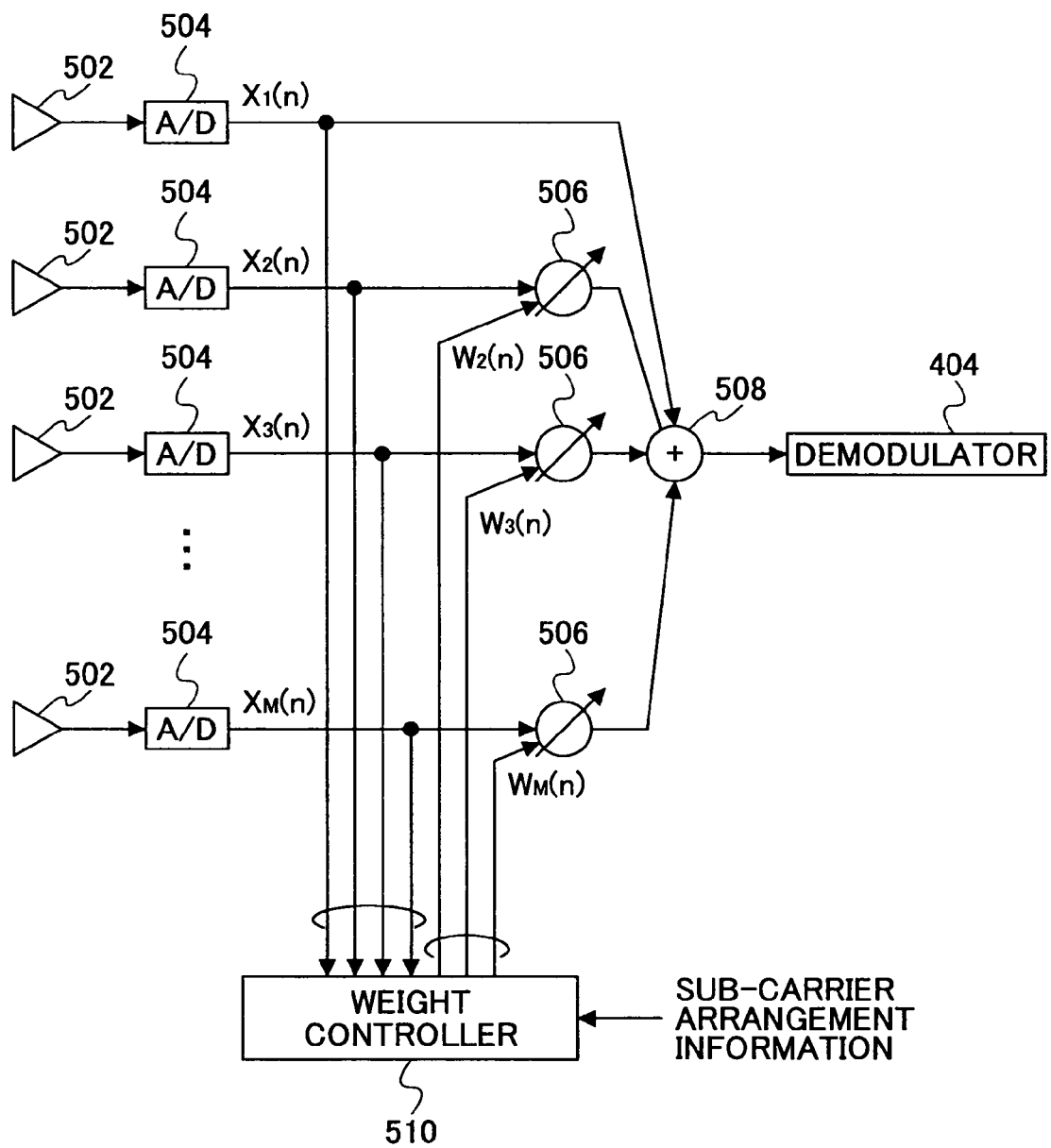
FIG. 5 is a block diagram illustrating details of the adaptive array antenna 402 shown in FIG. 4.

FIG. 5 is a block diagram illustrating details of the adaptive array antenna 402 shown in FIG. 4.

As illustrated in FIG. 5, the adaptive array antenna 402 includes plural (M) antenna elements 502 and analog-digital converters (A/D) 504 provided one for each of the antenna elements 502. The adaptive array antenna 402 has weight adjusting units 506 for adding weighting factors to signals obtained through the antenna elements 502. The adaptive array antenna 402 has a synthesizer 508 for appropriately synthesizing the signals from the antenna elements 502, and outputs the synthesized signal to a subsequent demodulator 404. In addition, the adaptive array antenna 402 has an antenna controller 510, which calculates control signals $w_j(n)$ to be supplied to the antenna elements 502 based on the signals $X_i(n)$ received by the antenna elements 502. Here, i is an integer greater than or equal to 1 and less than or equal to M, j is an integer greater than or equal to 2 and less than or equal to M, and n is a parameter indicating a sample number.

The signals received by the antenna elements 502 are appropriately processed by a non-illustrated front-end for waveform shaping, frequency transformation, and others, and M digital signals $X_i(n)$ are obtained through the analog-digital converters 504 of the respective antenna elements 502.

The weight adjusting units 506 add appropriate weighting factors to the digital signals $X_i(n)$. The synthesizer 508 appropriately synthesizes the digital signals $X_i(n)$.

The antenna controller 510 calculates the control signals $w_j(n)$ so that the signal component related to the virtual sub-carrier specified by the sub carrier arrangement information is reduced (to become zero). In response to the control signals $w_j(n)$, the weighting factors to be added to the digital signals $X_i(n)$ in the weight adjusting units 506 are determined.

In other words, in the signal output from the synthesizer 508, the signal component related to the virtual sub-carrier is reduced.

Here, a weight adjusting unit 506 corresponding to a control signal $w_1(n)$ is not illustrated; this is for the purpose of avoiding an obvious solution when optimizing the weight factors. Of course, there is no problem in generally providing the weight adjusting unit 506 corresponding to the control signal $w_1(n)$.

As described above, because the virtual sub-carrier is a sub-carrier not used for data transmission, it is preferable that this signal component be zero. However, because of frequency offsets or other interferences, sometimes the signal component in the received signal related to the virtual sub-carrier cannot be reduced to zero. This signal component becomes an interference component, and causes degradation of the signal quality. By updating a directional pattern of the antenna while adjusting the weight factors, it is possible to improve the signal quality of the received signal.

When using the transmission device 300 shown in FIG. 3 and the reception device 400 shown in FIG. 4, with the sub-carrier arrangement information, the position of the virtual sub-carrier can be arbitrarily dynamically changed between the transmission device and the reception device. In other words, in the present embodiment, the positions of at least a part of the virtual sub-carriers in the sub-carrier arrangement pattern are not fixed.

Figure 6:
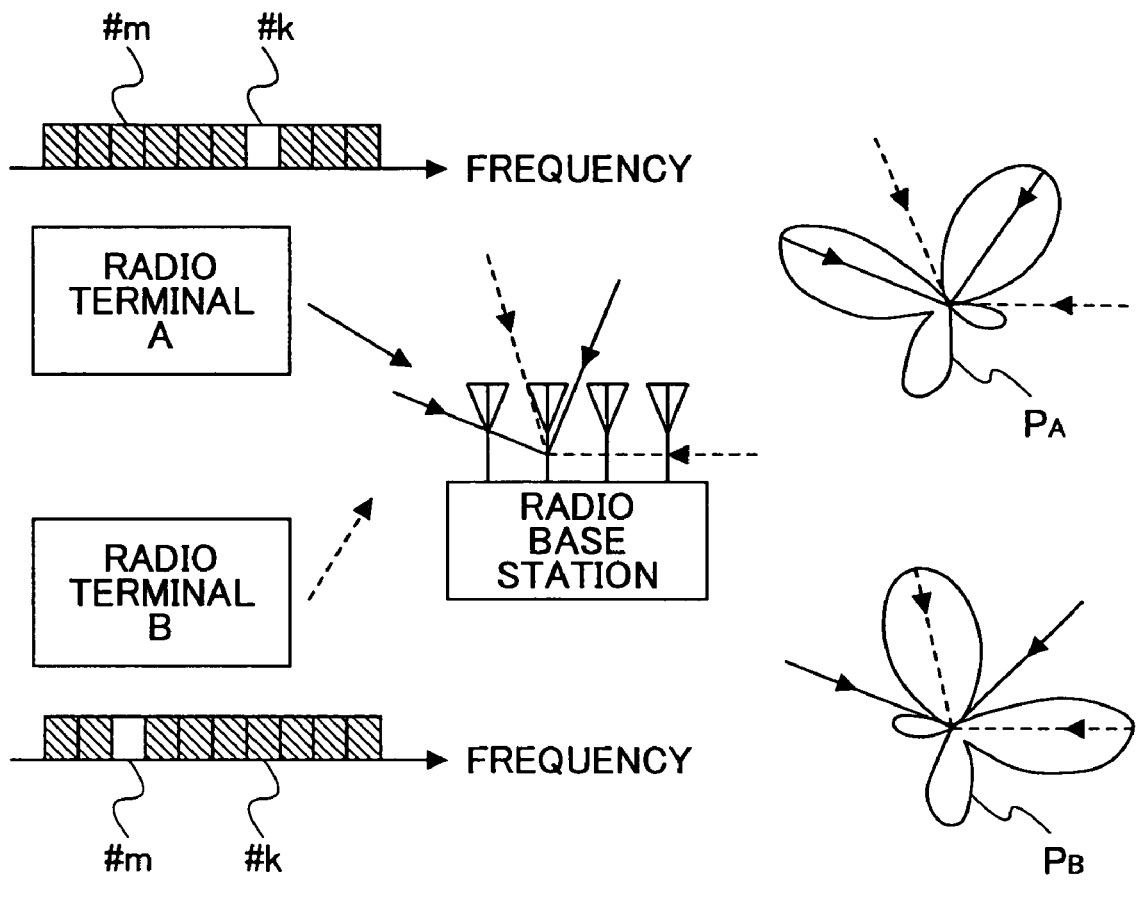
FIG. 6 is a diagram illustrating the principle of the present invention.

FIG. 6 is a diagram illustrating the principle of the present invention.

As illustrated in FIG. 6, for example, there are a radio terminal A, in which the k-th sub-carrier is set to be a virtual sub-carrier, and other sub-carriers including the m-th sub-carrier are set to be the data sub-carriers for communications; and a radio terminal B, in which the m-th sub-carrier is set to be a virtual sub-carrier, and other sub-carriers including the k-th sub-carrier are set to be the data sub-carriers for communications. On the side of a radio base station, if the k-th sub-carrier is set to be a virtual sub-carrier, and incoming waves are received while changing an antenna pattern $P_A$ so that the signal component of the virtual sub-carrier is reduced to be small, it is possible to have good reception of the incoming waves from the radio terminal A, while the incoming waves from the radio terminal B are suppressed.

With the antenna pattern $P_A$ being changed so that the signal component of the k-th sub-carrier is suppressed, the incoming signals from the radio terminal B are suppressed to be null.

Solid line arrows in FIG. 6 indicate incoming waves from the radio terminal A, and dashed line arrows indicate incoming waves from the radio terminal B.

Similarly, if the m-th sub-carrier is set to be a virtual sub-carrier, and incoming waves are received while changing an antenna pattern $P_B$ so that the signal component of the virtual sub-carrier is reduced to be small, it is possible to have good reception of the incoming waves from the radio terminal B, while the incoming waves from the radio terminal A are suppressed. This means that by making the virtual sub-carrier arrangements different, it is possible to distinguish the incoming waves from the radio terminals A and B. In other words, the sub-carrier arrangement patterns are used as identification information for distinguishing the incoming waves.

Figure 7:
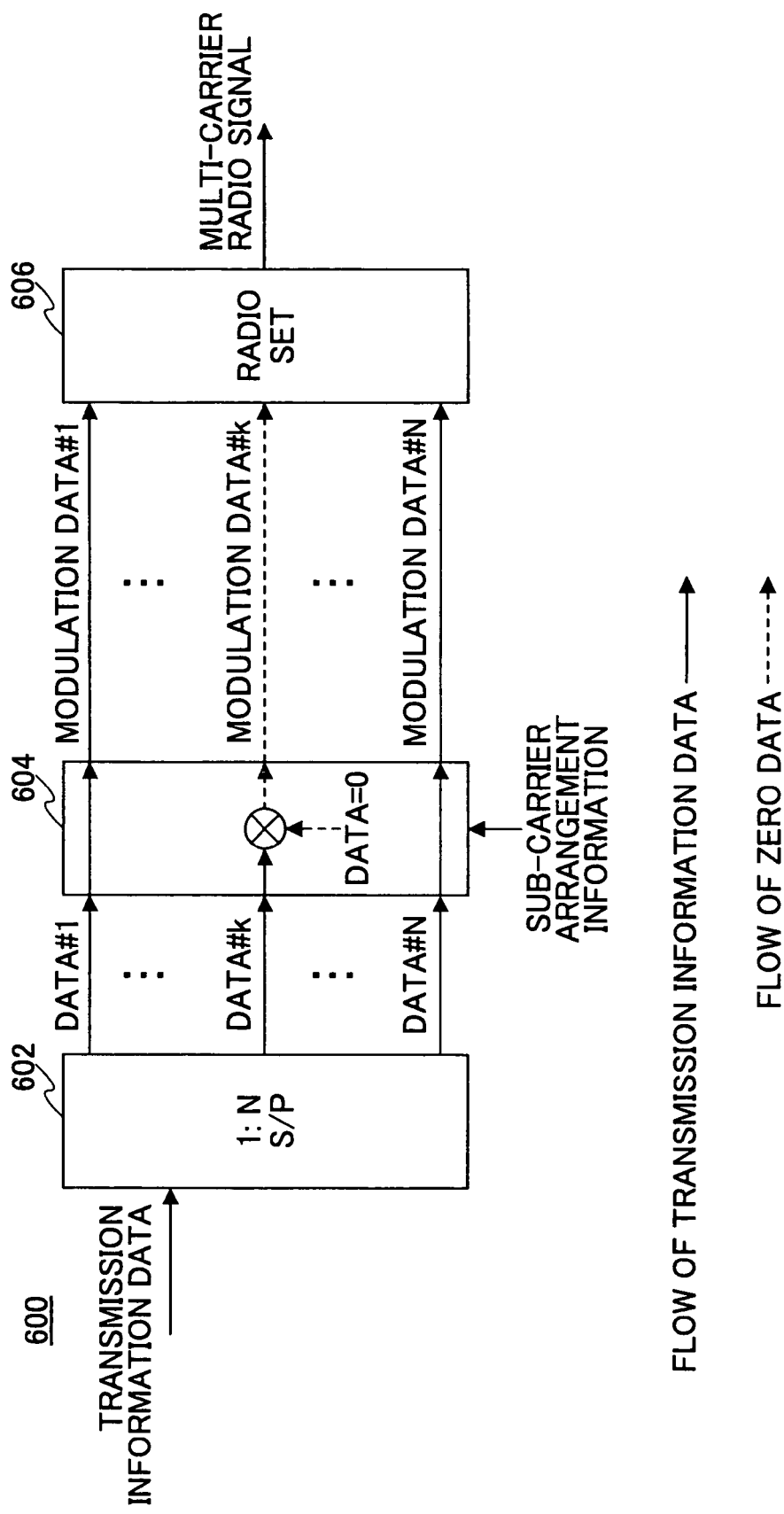
FIG. 7 is a block diagram illustrating principal functions of another transmission device according to the embodiment of the present invention.

FIG. 7 is a block diagram illustrating principal functions of another transmission device according to the embodiment of the present invention.

Generally, in FIG. 7, solid line arrows indicate flows of the transmission information data being transmitted to the receiver side, and dashed line arrows indicate flows of zero data.

A transmission device 600 has a series-parallel converter (S/P) 602, which sequentially converts a series signal including a series of transmission data to parallel signals and outputs the parallel signals. The series of transmission data are coded by a not-illustrated encoder. Various methods can be used for coding, for example, folding coding, and block coding.

The transmission device 600 has an assignment unit 604, which receives the parallel signals including N signal sequences, and sets the contents of the signal sequence specified by the sub-carrier arrangement information to correspond to the virtual sub-carrier. The contents of the signal sequence after the setting, for example, always indicate zero (zero data). Other signal sequences are output directly.

In this way, the sub-carrier arrangement information indicates which sub-carrier is set to be a virtual sub-carrier among the N sub-carriers (or, which sub-carrier is set to be a data sub-carrier), and this is determined when the communication link is established.

The transmission device 600 has a radio set 606, which receives the parallel signals including the N signal sequences and modulates the received signal sequences in correspondence with their respective sub-carriers, outputs a series signal, performs waveform shaping and frequency transformation and so on, and outputs multi-carrier radio signals. If OFDM is used, in the modulation, the Inverse Fast Fourier Transformation is performed, but the present invention is not limited to OFDM, for example, other mapping can be performed.

In this example, the number of the signal sequences output from the series-parallel converter 602 is the same as the number of the signal sequences received by the radio set 606. Hence, even on the side of the reception device, as the modulated N signal sequences, N signal sequences are converted into a series signal, and reception information data are obtained. Here, it is not necessary to provide an element, as in the assignment unit 406 in FIG. 4, for adjusting the number of the signal sequences. Nevertheless, the same as the reception device 400 in FIG. 4, directionality of the adaptive array antenna is controlled so that the signal component associated with the k-th sub-carrier (a virtual sub-carrier) is reduced to be small.

In the present example, among the N signal sequences representing the transmission information data from the S/P 602, one signal sequence (the k-th signal sequence) is forced to be zero, and then is input to the radio set 606; hence, a part of the transmission information data is lost. However, if the transmission information data input to the series-parallel converter 602 are properly coded, even when part of the N data are lost, it is possible to properly restore the data at the receiver side. This is because a coding technique is used to enable appropriate restoration of transmission data by decoding even when the communication environment is poor and a part of the transmission data are lost.

The fact that the content of the k-th signal sequence among the N received signal sequences is forced to be zero indicates the equivalent of a poor communication environment to that degree on the receiver side.

In the present example, by sacrificing a part of the transmission data, the transmission data become identifiable, and further, a data transmission speed is maintained to be comparable to that in the related art.

In the example shown in FIG. 3, although the transmission data are not sacrificed, the data transmission speed becomes (N−1)/N of that in the related art. In addition, when using the transmission device shown in FIG. 3, accordingly, the reception device shown in FIG. 4 has to be used. In contrast, when using the transmission device shown in FIG. 7, it is sufficient to just make a small number of modifications to the elements of the related art.

As for the transmission device 600, it is sufficient if it is possible to set the signal sequence specified according to the sub carrier arrangement information to be zero. As for the reception device, it is sufficient if it is possible to control the adaptive array antenna so that so that the signal component associated with the sub-carrier specified according to the sub carrier arrangement information is reduced to be small.

Therefore, from the point of view of data reliability, the example shown in FIG. 3 is preferable, while from the point of view of data transmission speed and modification to the existing system, the example shown in FIG. 7 is preferable. This trend becomes more and more noticeable when the number of the specified virtual sub-carriers increases.

FIG. 8 is a diagram illustrating the status of an uplink of a cellular communication system to which the present invention is applied.

In the system shown in FIG. 8, it is designated that different sub-carrier arrangement patterns are used between adjacent cells among cell A through cell G. Specifically, in cell A, the m-th sub-carrier; in cells F, B, D, the n-th sub-carrier; and in the cells G, C, E, the k-th sub-carrier are set to be virtual sub-carriers, and other sub-carrier are set to be data sub-carriers. Within each cell, the same sub-carrier arrangement pattern is used for communications. Hence, within one cell, a radio base station and a radio terminal communicate in a time-division manner.

A radio base station (not illustrated) in cell A controls an adaptive array antenna so that the signal component associated with the m-th sub-carrier is reduced. Thereby, it is possible to adjust a directional pattern PA so that the incoming waves from its own cell have good reception, while the incoming waves from adjacent cells (interference waves) are suppressed.

In this way, by making sub-carrier arrangement patterns different in different cells (or sectors) in the cellular communication system, it is possible to distinguish one's own cell (or sector) from others.

Figure 9:
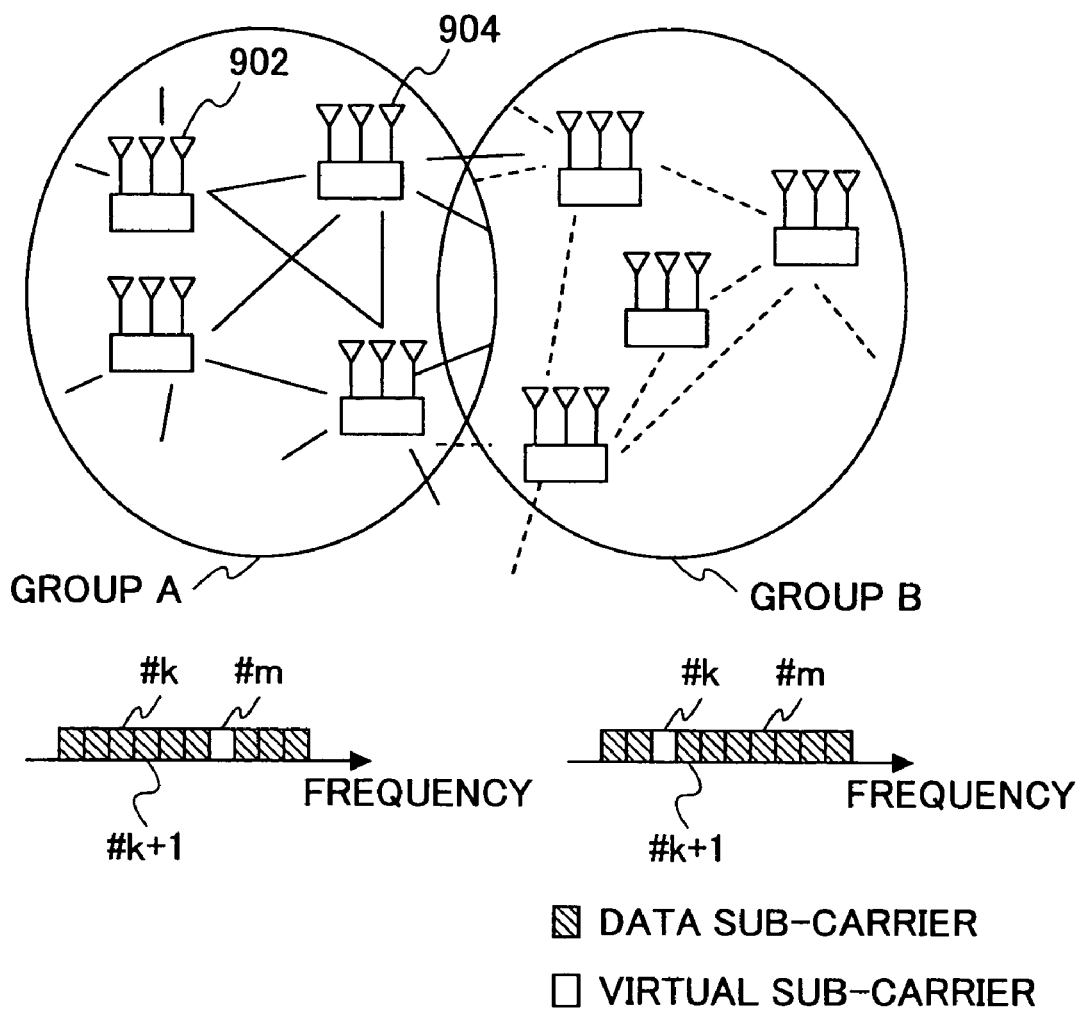
FIG. 9 is a diagram illustrating the status of a private area network to which the present invention is applied.

FIG. 9 is a diagram illustrating a status of a private area network (PAN) to which the present invention is applied.

As illustrated in FIG. 9, there are two neighboring groups A and B, and a communication terminal within each group has functions of a transmitter and a receiver having an adaptive array antenna. The group A and group B use different sub-carrier arrangement patterns. Specifically, in group A, the m-th sub-carrier, and in group B, the k-th sub-carrier are set to be virtual sub-carriers, and other sub-carrier are set to be data sub-carriers. Within each group, the same sub-carrier arrangement pattern is used for communications. With the system being configured in this way, a communication terminal is able to communicate while suppressing incoming waves from groups other than its own group.

As described above, because the same sub-carrier arrangement pattern is used within the same group, for example, when a communication terminal 902 belonging to the group A is in communication, a communication terminal 904 is not able to communicate. There are various methods of avoiding communication competition and communication confliction with the same group. For example, before the communication terminal 904 starts communications, it is helpful to investigate the signal component associated with the k-th sub-carrier. If the signal component has a sufficiently large magnitude, it indicates that another communication terminal (for example, the communication terminal 902) is in communication within the group, and the communication terminal 904 is not allowed to transmit signals. Conversely, if the signal component is zero, it indicates that communication is not being performed within the group. As for the incoming waves from group B, because the k-th sub-carrier is set to be the virtual sub-carrier in group B, even when the incoming waves from group B arrive, the detected magnitude of the signal component is zero. Hence, the value of the signal component related to the k-th sub-carrier is in connection with presence or absence of terminals in communication in group A.

It should be noted that it is not appropriate to investigate the value of the signal component related to the (k+1)-th sub-carrier, because when the signal component is detected, it cannot be distinguished from which of group A and group B the signal component comes.

Similarly, in group B, for example, before the communication is started, by investigating the signal component associated with the m-th sub-carrier, it is possible to avoid communication competition and communication confliction within the same group.

In this way, for a communication terminal belonging to one of plural groups using different sub-carrier arrangement patterns, by investigating the magnitude of a signal component of a sub-carrier set to be a virtual sub-carrier, it is possible to determine whether signal transmission should be performed.

In the embodiments described above, by changing the position of the virtual sub-carrier, communication terminals, cells (or sectors), or groups can be distinguished. However, the present invention is not limited to these embodiments, and it is possible to distinguish radio signals by using various arrangement patterns of the virtual sub-carriers.

Figure 10:
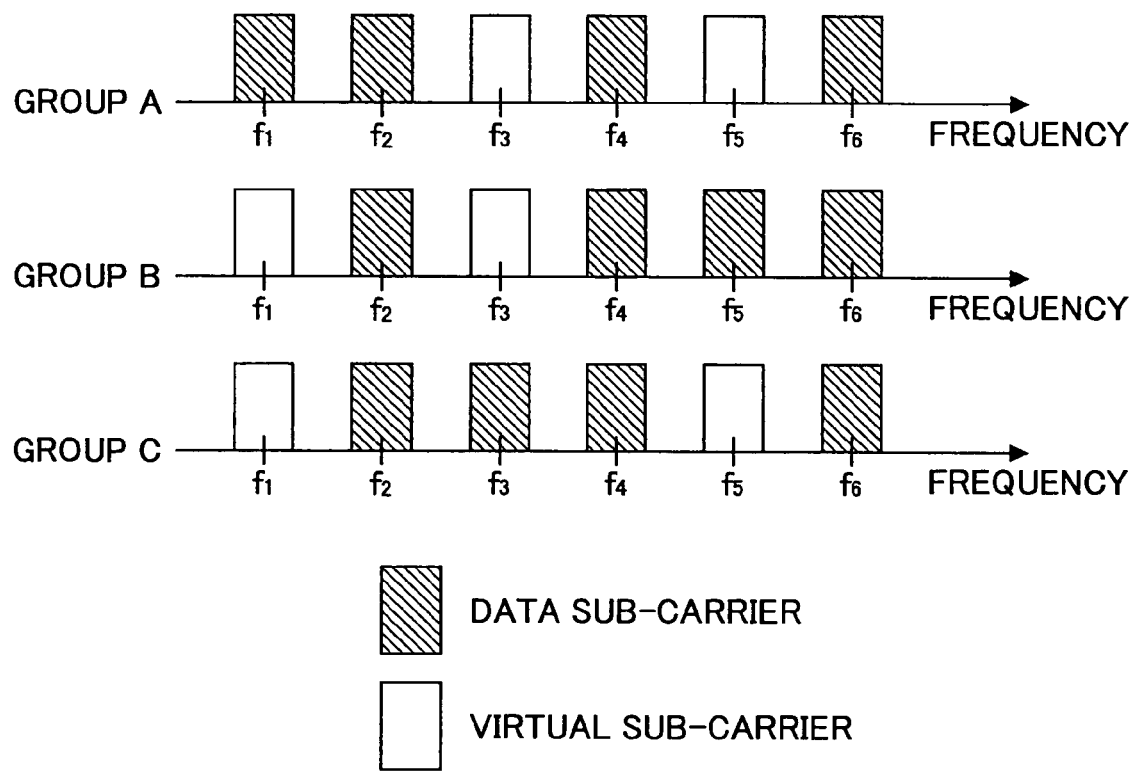
FIG. 10 is a diagram illustrating a sub-carrier arrangement pattern.

FIG. 10 is a diagram illustrating a sub-carrier arrangement pattern able to be used for distinguishing between three groups in a private area network. For simplicity, only six sub-carriers are illustrated in FIG. 10, but more sub-carriers can be arranged.

As illustrated in FIG. 10, in group A, sub-carriers f3, f5; in group B, sub-carriers f1, f3; and in group C, sub-carriers f1, f5 are set to be virtual sub-carriers, and other sub-carrier are set to be data sub-carriers.

In the course of communications within group A, because a directional pattern is adjusted so that the signal components associated with the sub-carriers f3, f5 included in the incoming waves are suppressed, it is possible to effectively suppress the incoming waves from group B and group C.

Before communications within group A start, the signal component associated with the sub-carrier f1 is investigated. Because the sub-carrier f1 is set to be a virtual sub-carrier in groups B and C, contribution from groups B and C is essentially zero. Hence, the value of the signal component related to the sub-carrier f1 is in connection with presence or absence of communication being made presently in group A.

Similarly, in group B, by investigating the signal component associated with the sub-carrier f5, it is possible to avoid communication conflict within the same group. In group C, by investigating the signal component associated with the sub-carrier f3, it is possible to avoid communication conflict within the same group.

In this way, it is possible to avoid communication conflict within the same group, and suppress the incoming waves from other groups.

Generally, to distinguish between N groups, it is necessary to set N−1 sub-carriers to be virtual sub-carriers, and form N different sub-carrier arrangement patterns. Further, in order to avoid communication conflict within the same group, it is necessary to set at least one sub-carrier, which is specified to be the data sub-carrier with one sub-carrier arrangement pattern, to be the virtual sub-carrier with the other sub-carrier arrangement patterns. By investigating the value of the signal component associated with the sub-carrier before starting communications, it is possible to avoid communication conflict within the same group. In group C, by investigating the signal component associated with the sub-carrier f3, it is possible to determine whether communication is being made presently in the same group. Such kind of sub-carrier arrangement pattern is not limited to groups of a private area network, but can be used to identify any incoming wave.

While the invention has been described with reference to preferred embodiments, the invention is not limited to these embodiments, but numerous modifications could be made thereto without departing from the basic concept and scope described in the claims.

The invention claimed is:

1. A transmission device in a multi-carrier radio transmission system, which system performs radio transmission based on a plurality of data sub-carriers and a plurality of virtual sub-carriers, and uses the plurality of data sub-carriers for data transmission, comprising;
   a designating unit configured to designate at least one sub-carrier as a virtual sub-carrier according to sub-carrier arrangement information based on a pattern among a plurality of sub-carrier arrangement patterns in which at least some of virtual sub-carrier arrangements are different, which pattern is different from patterns among the plurality of sub-carrier arrangement patterns used by other transmission devices so that a reception device distinguishes a transmission signal from the transmission device from transmission signals from the other transmission devices, wherein at least one sub-carrier set to be a data sub-carrier in one of the at least some of virtual sub-carrier arrangements used by the transmission device is also set to be a data sub-carrier in another of the at least some of virtual sub-carrier arrangements used by another transmission device at any time at least during a communication using an established communication link.

2. The transmission device as claimed in the claim 1, wherein at least one sub-carrier set to be a data sub-carrier in one among the plurality of sub-carrier arrangement patterns is set to be a virtual sub-carrier in another among the plurality of sub-carrier arrangement patterns.

3. A multi-carrier radio transmission system that performs radio transmission based on a plurality of data sub-carriers and a plurality of virtual sub-carriers, and uses the plurality of data sub-carriers for data transmission, the multi-carrier radio transmission system comprising:
   a transmission device that designates at least one sub-carrier set to be a virtual sub-carrier according to sub-carrier arrangement information based on a pattern among a plurality of sub-carrier arrangement patterns in which at least some of virtual sub-carrier arrangements are different, which pattern is different from patterns among the plurality of sub-carrier arrangement patterns used by other transmission devices so that a reception device distinguishes a transmission signal from the transmission device from transmission signals from the other transmission devices, wherein at least one sub-carrier set to be a data sub-carrier in one of the at least some of virtual sub-carrier arrangements used by the transmission device is also set to be a data sub-carrier in another of the at least some of virtual sub-carrier arrangements used by another transmission device at any time at least during a communication using an established communication link; and the reception device including
   an adaptive array antenna unit that is adaptively controlled so that signal components associated with virtual sub-carriers in received signals are reduced, and
   a determination unit configured to determine the pattern to be used in communications among the plurality of sub-carrier arrangement patterns.

4. A transmission device in a multi-carrier radio transmission system, which system performs radio transmission based on a plurality of data sub-carriers and a plurality of virtual sub-carriers, and uses the plurality of data sub-carriers for data transmission, the transmission device comprising:

a series parallel conversion unit configured to convert a series signal into parallel signals including a predetermined number of signal sequences;

a radio unit configured to receive signal sequences that include more than the predetermined number of signal sequences in parallel for respective sub-carriers and to modulate the received signal sequences; and an assignment unit configured to assign, based on sub-carrier arrangement information according to a pattern among a plurality of sub-carrier arrangement patterns in which at least some of virtual sub-carrier arrangements are different, which pattern is different from patterns among the plurality of sub-carrier arrangement patterns used by other transmission devices so that a reception device distinguishes a transmission signal from the transmission device from transmission signals from the other transmission devices, wherein at least one sub-carrier set to be a data sub-carrier in one of the at least some of virtual sub-carrier arrangements used by the transmission device is also set to be a data sub-carrier in another of the at least some of virtual sub-carrier arrangements used by another transmission device at any time at least during a communication using an established communication link, signal sequences associated with virtual sub-carriers to at least one of the signal sequences, the number of which signal sequences exceeds the predetermined number.

5. The transmission device as claimed in the claim 4, wherein the series signal is a signal sequence obtained by encoding transmission data.

6. The transmission device as claimed in the claim 4, wherein at least one sub-carrier set to be a data sub-carrier in one among the plurality of sub-carrier arrangement patterns is set to be a virtual sub-carrier in another among the plurality of sub-carrier arrangement patterns.

7. A reception device used in a multi-carrier radio transmission system, which system performs radio transmission based on a plurality of sub-carriers, the reception device comprising:

a radio unit configured to demodulate radio signals received through an adaptive array antenna unit, and to output parallel signals including a predetermined number of signal sequences corresponding to sub-carriers;

a parallel series conversion unit configured to convert the parallel signals into a series signal; and an assignment unit configured to assign signal sequences other than signal sequences designated as virtual sub-carriers according to sub-carrier arrangement information based on a pattern among a plurality of sub-carrier arrangement patterns in which at least some of virtual sub-carrier arrangements are different, which pattern is used by a transmission device and is different from patterns among the plurality of sub-carrier arrangement patterns used by other transmission devices so that the reception device distinguishes incoming waves received from the transmission device from incoming waves received from the other transmission devices, wherein at least one sub-carrier set to be a data sub-carrier in one of the at least some of virtual sub-carrier arrangements used by the transmission device is also set to be a data sub-carrier in another of the at least some of virtual sub-carrier arrangements used by another transmission device at any time at least during a communication using an established communication link, in the parallel signals output from the radio unit to the parallel signals input to the parallel series conversion unit.

8. The reception device as claimed in the claim 7, wherein at least one sub-carrier set to be a data sub-carrier in one among the plurality of sub-carrier arrangement patterns is set to be a virtual sub-carrier in another among the plurality of sub-carrier arrangement patterns.

9. A transmission device in a multi-carrier radio transmission system, which system performs radio transmission based on a plurality of data sub-carriers and a plurality of virtual sub-carriers, and uses the plurality of data sub-carriers for data transmission, the transmission device comprising:

a series parallel conversion unit configured to convert a series signal into parallel signals including a predetermined number of signal sequences;

a radio unit configured to receive a plurality of signal sequences in parallel for respective sub-carriers and to modulate the plurality of signal sequences; and a setting unit configured to set contents of at least one of signal sequences designated as virtual sub-carriers according to sub-carrier arrangement information based on a pattern among a plurality of sub-carrier arrangement patterns in which at least some of virtual sub-carrier arrangements are different, which pattern is different from patterns among the plurality of sub-carrier arrangement patterns used by other transmission devices so that a reception device distinguishes a transmission signal from the transmission device from transmission signals from the other transmission devices, wherein at least one sub-carrier set to be a data sub-carrier in one of the at least some of virtual sub-carrier arrangements used by the transmission device is also set to be a data sub-carrier in another of the at least some of virtual sub-carrier arrangements used by another transmission device at any time at least during a communication using an established communication link, in the predetermined number of signal sequences to correspond to the virtual sub-carriers.

10. The transmission device as claimed in the claim 9, wherein the series signal is a signal sequence obtained by encoding transmission data.

11. The transmission device as claimed in the claim 9, wherein at least one sub-carrier set to be a data sub-carrier in one among the plurality of sub-carrier arrangement patterns is set to be a virtual sub-carrier in another among the plurality of sub-carrier arrangement patterns.

12. A transmission device in a multi-carrier radio transmission system, which system performs radio transmission based on a plurality of data sub-carriers and a plurality of virtual sub-carriers, and uses the plurality of data sub-carriers for data transmission, comprising:
   a setting unit configured to set at least one sub-carrier as a virtual sub-carrier according to sub-carrier arrangement information so that respective destinations of two or more transmission signals are distinguished from each other based on arrangements of virtual sub-carriers, wherein at least one sub-carrier set to be a data sub-carrier in one of the arrangements of virtual sub-carriers used for one destination of the respective destinations is also set to be a data sub-carrier in another of the arrangements of virtual sub-carriers used by another destination of the respective destinations at any time at least during a communication using an established communication link.

13. A multi-carrier radio transmission system that performs radio transmission based on a plurality of data sub-carriers and a plurality of virtual sub-carriers, and uses the plurality of data sub-carriers for data transmission, the multi-carrier radio transmission system comprising:
   a transmission device that designates at least one sub-carrier set to be a virtual sub-carrier according to sub-carrier arrangement information; and
   a reception device including
      an adaptive array antenna unit that is adaptively controlled so that signal components associated with virtual sub-carriers in received signals are reduced; and
      a determination unit configured to determine a pattern to be used in communications among a plurality of sub-carrier arrangement patterns in which at least some of virtual sub-carrier arrangements are different,
   wherein respective destinations of two or more transmission signals are distinguished for respective reception devices based on arrangements of virtual sub-carriers, and at least one sub-carrier set to be a data sub-carrier in one of the arrangements of virtual sub-carriers used for one destination of the respective destinations is also set to be a data sub-carrier in another of the at least some of virtual sub-carrier arrangements used by another destination of the respective destinations at any time at least during a communication using an established communication link.

14. A transmission device in a multi-carrier radio transmission system, which system performs radio transmission based on a plurality of data sub-carriers and a plurality of virtual sub-carriers, and uses the plurality data sub-carriers for data transmission, the transmission device comprising:
   a series parallel conversion unit configured to convert a series signal into parallel signals including a predetermined number of signal sequences;
   a radio unit configured to receive signal sequences that include more than the predetermined number of signal sequences in parallel for respective sub-carriers and to modulate the received signal sequences to create a radio transmission signal; and
   an assignment unit configured to assign, based on sub-carrier arrangement information, signal sequences associated with virtual sub-carriers to at least one of the signal sequences, the number of which signal sequences exceeds the predetermined number, so that respective destinations of two or more transmission signals are distinguished for respective reception devices based on arrangements of virtual sub-carriers, wherein at least one sub-carrier set to be a data sub-carrier in one of the arrangements of virtual sub-carriers used for one destination of the respective destinations is also set to be a data sub-carrier in another of the arrangements of virtual sub-carriers used for another destination of the respective destinations at any time at least during a communication using an established communication link.

15. A transmission device in a multi-carrier radio transmission system, which system performs radio transmission based on a plurality of data sub-carriers and a plurality of virtual sub-carriers, and uses the plurality of data sub-carriers for data transmission, the transmission device comprising:
   a series parallel conversion unit configured to convert a series signal into parallel signals including a predetermined number of signal sequences;
   a radio unit configured to receive a plurality of signal sequences in parallel for respective sub-carriers and to modulate the plurality of signal sequences to create a radio transmission signal; and
   a setting unit configured to set contents of at least one of signal sequences designated according to sub-carrier arrangement information in the predetermined number of signal sequences to correspond to virtual sub-carriers, so that respective destinations of two or more transmission signals are distinguished for respective reception devices based on arrangements of virtual sub-carriers, wherein at least one sub-carrier set to be a data sub-carrier in one of the arrangements of virtual sub-carriers used for one destination of the respective destinations is also set to be a data sub-carrier in another of the arrangements of virtual sub-carriers used for another destination of the respective destinations at any time at least during a communication using an established communication link.

* * * * *